US012730668B2

(12) United States Patent
Foley

(10) Patent No.: US 12,730,668 B2
(45) Date of Patent: Sep. 8, 2026

(54) LOAD LATENCY AMELIORATION USING BUNCH BUFFERS

(71) Applicant: Ascenium, Inc., Campbell, CA (US)

(72) Inventor: Peter Foley, Los Altos Hills, CA (US)

(73) Assignee: Ascenium, Inc., Mountain View, CA (US)

( * ) Notice: Subject to any disclaimer, the term of this patent is extended or adjusted under 35 U.S.C. 154(b) by 703 days.

(21) Appl. No.: 17/963,226

(22) Filed: Oct. 11, 2022

(65) Prior Publication Data

US 2023/0031902 A1 Feb. 2, 2023

Related U.S. Application Data

(63) Continuation-in-part of application No. 17/526,003, filed on Nov. 15, 2021, which is a continuation-in-part of application No. 17/465,949, filed on Sep. 3, 2021.

(60) Provisional application No. 63/402,490, filed on Aug. 31, 2022, provisional application No. 63/400,087, filed on Aug. 23, 2022, provisional application No. 63/393,989, filed on Aug. 1, 2022, provisional application No. 63/388,268, filed on Jul. 12, 2022, (Continued)

(51) Int. Cl.
*G06F 9/48* (2006.01)
*G06F 9/54* (2006.01)

(52) U.S. Cl.
CPC ............ *G06F 9/4843* (2013.01); *G06F 9/544* (2013.01)

(58) Field of Classification Search
CPC .... G06F 9/4881; G06F 9/5016; G06F 9/5027; G06F 12/084; G06F 8/445
See application file for complete search history.

(56) References Cited

U.S. PATENT DOCUMENTS 5,594,884 A 1/1997 Matoba et al.
5,764,994 A 6/1998 Craft (Continued)

FOREIGN PATENT DOCUMENTS

KR 10-2015-0051083 A 5/2015
WO WO2011038940 A1 4/2011

OTHER PUBLICATIONS

Musicus, B. R. (1988). The OKI advanced array processor (AAP): Development Software Manual.

(Continued)

*Primary Examiner* — Sisley N Kim
(74) *Attorney, Agent, or Firm* — Adams Intellex, PLC

(57) ABSTRACT

Techniques for task processing based on load latency amelioration using bunch buffers are disclosed. A two-dimensional array of compute elements is accessed. Each compute element within the array of compute elements is known to a compiler and is coupled to its neighboring compute elements within the array of compute elements. Control for the compute elements is provided on a cycle-by-cycle basis. The control is enabled by a stream of wide control words generated by the compiler. Sets of control word bits are loaded into buffers. Each buffer is associated with and coupled to a unique compute element within the array of compute elements. The sets of control word bits provide operational control for the compute element with which it is associated. Operations are executed within the array of elements. The operations are based on a selected set of control word bits which comprise a control word bunch.

25 Claims, 7 Drawing Sheets

Related U.S. Application Data provisional application No. 63/357,030, filed on Jun. 30, 2022, provisional application No. 63/340,499, filed on May 11, 2022, provisional application No. 63/322,245, filed on Mar. 22, 2022, provisional application No. 63/318,413, filed on Mar. 10, 2022, provisional application No. 63/295,544, filed on Dec. 31, 2021, provisional application No. 63/254,557, filed on Oct. 12, 2021, provisional application No. 63/232,230, filed on Aug. 12, 2021, provisional application No. 63/229,466, filed on Aug. 4, 2021, provisional application No. 63/193,522, filed on May 26, 2021, provisional application No. 63/166,298, filed on Mar. 26, 2021, provisional application No. 63/125,994, filed on Dec. 16, 2020, provisional application No. 63/114,003, filed on Nov. 16, 2020, provisional application No. 63/091,947, filed on Oct. 15, 2020, provisional application No. 63/075,849, filed on Sep. 9, 2020.

(56) References Cited

U.S. PATENT DOCUMENTS 7,840,777 B2 11/2010 Mykland
8,694,978 B1 4/2014 Rus et al.
8,856,768 B2 10/2014 Mykland
8,869,123 B2 10/2014 Mykland
8,949,806 B1 2/2015 Lee et al.
9,158,544 B2 10/2015 Mykland
9,275,002 B2 3/2016 Manet et al.
9,304,770 B2 4/2016 Mykland
9,395,992 B2 7/2016 Doing et al.
9,424,055 B2 8/2016 Lundvall et al.
9,473,155 B2 10/2016 Staszewski et al.
9,477,470 B2 10/2016 Mykland
9,529,715 B2 12/2016 Kumar et al.
9,582,277 B2 2/2017 Muff et al.
9,594,559 B2 3/2017 Fontenot et al.
9,600,287 B2 3/2017 Gschwind et al.
9,633,160 B2 4/2017 Mykland
9,652,238 B2 5/2017 Muff et al.
9,684,511 B2 6/2017 Shanbhogue et al.
9,830,164 B2 11/2017 Yazdani
9,851,969 B2 12/2017 Greiner et al.
9,886,277 B2 2/2018 Loktyukhin et al.
9,898,293 B2 2/2018 Whittaker
9,921,836 B2 3/2018 Kumar et al.
9,928,062 B2 3/2018 Azagury et al.
9,934,040 B2 4/2018 Bonanno et al.
9,971,605 B2 5/2018 Henry et al.
9,977,674 B2 5/2018 Rupley, II et al.
9,977,675 B2 5/2018 Nystad
9,977,679 B2 5/2018 Caulfield et al.
9,983,882 B2 5/2018 Greiner et al.
9,983,884 B2 5/2018 Maiyuran et al.
10,089,277 B2 10/2018 Mykland
10,592,250 B1 * 3/2020 Diamant ................ G06N 3/048
10,861,126 B1 * 12/2020 Sharma ................ G06F 9/4881
2002/0174318 A1 11/2002 Studdard et al.
2004/0111710 A1 6/2004 Chakradhar et al.
2013/0326190 A1 12/2013 Chung et al.
2014/0040598 A1 2/2014 Fleischer et al.
2014/0149657 A1 5/2014 Jakovljevic et al.
2014/0317383 A1 10/2014 Park et al.
2015/0186146 A1 7/2015 Kushida et al.
2016/0246602 A1 8/2016 Radhika et al.
2016/0313984 A1 * 10/2016 Meixner ............. G06F 9/30032
2018/0225116 A1 8/2018 Henry et al.
2018/0307980 A1 10/2018 Barik et al.
2018/0322606 A1 11/2018 Das et al.
2018/0341493 A1 11/2018 Roy et al.
2019/0004777 A1 1/2019 Meixner
2019/0347190 A1 11/2019 Singh
2019/0369990 A1 12/2019 Doerr et al.
2020/0026498 A1 1/2020 Sumbul et al.
2020/0226058 A1 * 7/2020 Lee ..................... G06F 12/1009
2020/0241879 A1 7/2020 Vorbach et al.
2021/0026637 A1 1/2021 Vorbach
2022/0413850 A1 * 12/2022 Gately .................. G06F 9/3004
2023/0289182 A1 * 9/2023 Hussain ................ G06F 9/3001

OTHER PUBLICATIONS

Podobas, Artur, Kentaro Sano, and Satoshi Matsuoka. "A survey on coarse-grained reconfigurable architectures from a performance perspective." IEEE Access 8 (2020): 146719-146743.
International Search Report dated Feb. 9, 2023 for PCT/US2022/046210.
Chang, Kyungwook, and Kiyoung Choi. "Mapping control intensive kernels onto coarse-grained reconfigurable array architecture." 2008 International SoC Design Conference. vol. 1. IEEE, 2008.

* cited by examiner

LOAD BUFFERS
518

UPPER MULTIPLIER UNITS
514

COMPUTE ELEMENTS
510

LOWER MULTIPLIER UNITS
512

LOAD BUFFERS
516

LOAD LATENCY AMELIORATION USING BUNCH BUFFERS

RELATED APPLICATIONS

This application claims the benefit of U.S. provisional patent applications "Load Latency Amelioration Using Bunch Buffers" Ser. No. 63/254,557, filed Oct. 12, 2021, "Compute Element Processing Using Control Word Templates" Ser. No. 63/295,544, filed Dec. 31, 2021, "Highly Parallel Processing Architecture With Out-Of-Order Resolution" Ser. No. 63/318,413, filed Mar. 10, 2022, "Autonomous Compute Element Operation Using Buffers" Ser. No. 63/322,245, filed Mar. 22, 2022, "Parallel Processing Of Multiple Loops With Loads And Stores" Ser. No. 63/340,499, filed May 11, 2022, "Parallel Processing Architecture With Split Control Word Caches" Ser. No. 63/357,030, filed Jun. 30, 2022, "Parallel Processing Architecture With Countdown Tagging" Ser. No. 63/388,268, filed Jul. 12, 2022, "Parallel Processing Architecture With Dual Load Buffers" Ser. No. 63/393,989, filed Aug. 1, 2022, "Parallel Processing Architecture With Bin Packing" Ser. No. 63/400,087, filed Aug. 23, 2022, and "Parallel Processing Architecture With Memory Block Transfers" Ser. No. 63/402,490, filed Aug. 31, 2022.

This application is also a continuation-in-part of U.S. patent application "Highly Parallel Processing Architecture With Compiler" Ser. No. 17/526,003, filed Nov. 15, 2021, which claims the benefit of U.S. provisional patent applications "Highly Parallel Processing Architecture With Compiler" Ser. No. 63/114,003, filed Nov. 16, 2020, "Highly Parallel Processing Architecture Using Dual Branch Execution" Ser. No. 63/125,994, filed Dec. 16, 2020, "Parallel Processing Architecture Using Speculative Encoding" Ser. No. 63/166,298, filed Mar. 26, 2021, "Distributed Renaming Within A Statically Scheduled Array" Ser. No. 63/193,522, filed May 26, 2021, "Parallel Processing Architecture For Atomic Operations" Ser. No. 63/229,466, filed Aug. 4, 2021, "Parallel Processing Architecture With Distributed Register Files" Ser. No. 63/232,230, filed Aug. 12, 2021, and "Load Latency Amelioration Using Bunch Buffers" Ser. No. 63/254,557, filed Oct. 12, 2021.

The U.S. patent application "Highly Parallel Processing Architecture With Compiler" Ser. No. 17/526,003, filed Nov. 15, 2021 is also a continuation-in-part of U.S. patent application "Highly Parallel Processing Architecture With Shallow Pipeline" Ser. No. 17/465,949, filed Sep. 3, 2021, which claims the benefit of U.S. provisional patent applications "Highly Parallel Processing Architecture With Shallow Pipeline" Ser. No. 63/075,849, filed Sep. 9, 2020, "Parallel Processing Architecture With Background Loads" Ser. No. 63/091,947, filed Oct. 15, 2020, "Highly Parallel Processing Architecture With Compiler" Ser. No. 63/114,003, filed Nov. 16, 2020, "Highly Parallel Processing Architecture Using Dual Branch Execution" Ser. No. 63/125,994, filed Dec. 16, 2020, "Parallel Processing Architecture Using Speculative Encoding" Ser. No. 63/166,298, filed Mar. 26, 2021, "Distributed Renaming Within A Statically Scheduled Array" Ser. No. 63/193,522, filed May 26, 2021, Parallel Processing Architecture For Atomic Operations" Ser. No. 63/229,466, filed Aug. 4, 2021, and "Parallel Processing Architecture With Distributed Register Files" Ser. No. 63/232,230, filed Aug. 12, 2021.

Each of the foregoing applications is hereby incorporated by reference in its entirety.

FIELD OF ART

This application relates generally to task processing and more particularly to a load latency amelioration using bunch buffers.

BACKGROUND

Organizations process immense, varied, and at times unstructured datasets for a wide variety of purposes. The purposes include commercial, educational, governmental, medical, research, or retail purposes, to name only a few. The datasets can be analyzed for forensic and law enforcement purposes as well. Computational resources to meet organizational needs are obtained and implemented by the organizations. The organizations range in size from sole proprietor operations, to large, international organizations. The computational resources include processors, data storage units, networking and communications equipment, telephony, power conditioning units, HVAC equipment, and backup power units, among other essential equipment. Energy resource management is also critical since the computational resources consume vast amounts of energy and produce prodigious heat. Further, the computational resources may require a high level of security and can be housed in special-purpose installations that provide this highly secure protection of data. These installations more closely resemble high-security vaults than traditional office buildings. Not every organization requires vast computational equipment installations, but all strive to provide resources to meet their data processing needs as quickly and cost effectively as possible.

The computational resources installations process data, typically 24×7×365. The types of data processed directly derive from the organizational missions. The organizations execute large numbers of a wide variety of processing jobs. The processing jobs include running billing and payroll, generating profit and loss statements, processing tax returns or election results, controlling experiments, analyzing research data, and generating grades, among others. These processing jobs must be executed quickly, accurately, and cost-effectively. The processed datasets can be very large, thereby straining the computational resources. Further, the datasets can be unstructured. As a result, processing an entire dataset may be required to find a particular data element. Effective processing of a dataset can be a boon for an organization, by quickly identifying potential customers, or by fine tuning production and distribution systems, among other results that yield a competitive advantage to the organization. On the other hand, ineffective processing wastes money by losing sales or failing to streamline a process, thereby increasing costs.

A wide variety of data collection techniques are implemented by the organizations in order to collect their data. The techniques are intended to harvest the data from a diverse range of individuals. At times, the individuals are willing participants who "opt in" to the data collection by signing up, registering, enrolling, creating an account, or otherwise willingly agreeing to participate in the data collection. At other times, the individuals are unwitting subjects of data collection. Other techniques are legislative, such as a government requiring citizens to obtain a registration number and to set up an account to use that number for interaction with government agencies, law enforcement, emergency services, and others. Still other data collection techniques are more subtle or are even completely hidden, such as tracking purchase histories, website visits to various websites, button clicks, and menu choices. Unfortunately, data can and has been collected by theft. Irrespective of the techniques used for the data collection, the collected data is highly valuable to the organizations if processed rapidly and accurately.

SUMMARY

Organizations of all sizes perform large numbers of processing jobs in support of their organizational missions. Successful execution of the processing jobs is deemed critical to the organization, so timely and efficient completion of the processing jobs is essential. The types of jobs that are processed include running payroll, analyzing research data, or training a neural network for machine learning, among many others. These processing jobs are highly complex and are based on the successful completion of many tasks. The tasks enable processing by loading, storing, and maintaining various datasets, accessing processing components and systems, executing data processing operations, and so on. The tasks are often built from subtasks, which themselves are frequently complex. The subtasks are typically used to handle specific jobs such as loading data such as a dataset from storage; performing arithmetic computations, logic evaluations, and other manipulations of the data; storing the data back to storage; handling inter-subtask communication such as data transfer and control; and so on. The datasets that are accessed are often vast in size and can easily overwhelm traditional processing architectures. Any processing architecture that is either ill-suited to the processing tasks or inflexible in its design simply cannot manage the data handing and computation tasks effectively and efficiently.

To greatly improve task processing efficiency and throughput, two-dimensional (2D) arrays of elements can be used for the processing of the tasks and subtasks. The 2D arrays include compute elements, multiplier elements, registers, caches, queues, register files, buffers, scratchpads, controllers, decompressors, arithmetic logic units (ALUs), storage elements, and other components which can communicate among themselves. These arrays of elements are configured and operated by providing control to the array of elements on a cycle-by-cycle basis. The control of the 2D array is accomplished by providing control words generated by a compiler. The control includes a stream of control words, where the control words can include wide control words, such as wide microcode control words, generated by the compiler. The wide control words are based on bits. A selected set of control word bits forms a control word bunch. Sets of control word bits or bunches can be loaded into buffers. The buffers into which the bunches can be loaded can include bunch buffers. The bunch buffers are coupled to compute elements and can control the compute elements. The control word bunches are used to configure the array of compute elements, to control the flow or transfer of data, and to control the processing of the tasks and subtasks. The bunches can enable autonomous execution, by the array, of compute element operations associated the wide control words.

Operation looping is enabled by a pointer that indicates the next set of control word bits to access in order to control the compute elements. The pointer enables operation looping within the compute elements through the control word bunches. The operation looping enables repeated execution of the control word bunches without additional control word loading. The operation looping accomplishes dataflow processing within statically scheduled compute elements. The array of compute elements can be configured in a topology which is best suited to the task processing. The topologies into which the arrays can be configured include a systolic, a vector, a cyclic, a spatial, a streaming, or a Very Long Instruction Word (VLIW) topology, among others. The topologies can include a topology that enables machine learning functionality.

Task processing is based on load latency amelioration using bunch buffers. A two-dimensional array of compute elements is accessed, wherein each compute element within the array of compute elements is known to a compiler and is coupled to its neighboring compute elements within the array of compute elements. Control for the array of compute elements is provided on a cycle-by-cycle basis, wherein the control is enabled by a stream of wide control words generated by the compiler. Sets of control word bits are loaded into buffers, wherein each buffer is associated with and coupled to a unique compute element within the array of compute elements, and wherein the sets of control word bits provide operational control for the compute element with which it is associated. The selected set of control word bits comprises a control word bunch. A control word bunch enables operational control of a particular compute element for a plurality of cycles. Operations are executed within the array of compute elements, wherein the operations are based on a selected set of control word bits.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
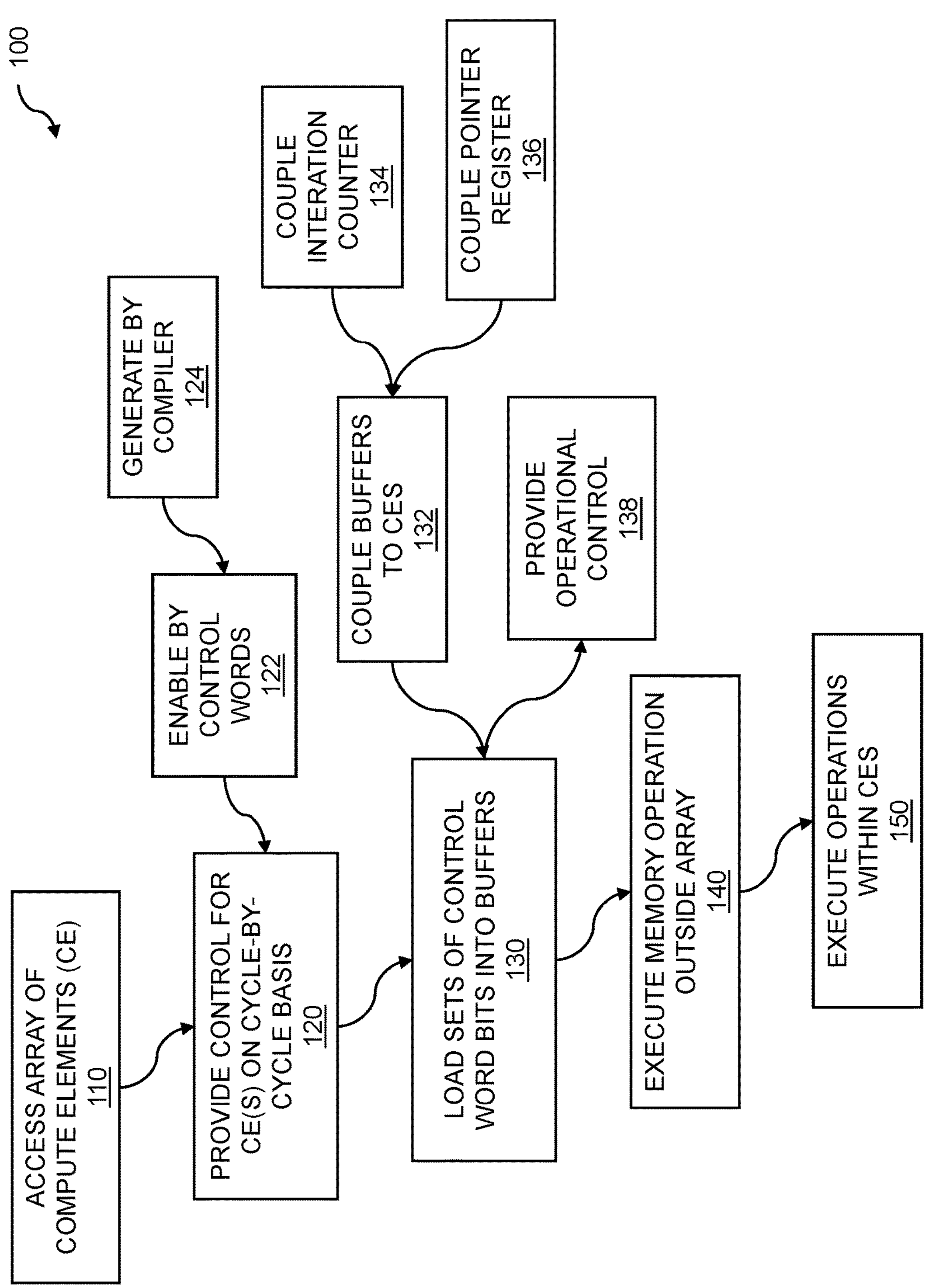
FIG. 1 is a flow diagram for load latency amelioration using bunch buffers.

Techniques for load latency amelioration using bunch buffers are disclosed. In an architecture such as an architecture based on configurable compute elements as described herein, the loading of data, control words, control word bits or control word "bunches", and so on, can cause execution of a process, task, subtask, and so on, to stall. The stalling can cause execution of a single compute element to halt or suspend while needed data and control is obtained. In the worst case, the stalling of the compute element can result in stalling of an entire array of compute elements. Noted throughout, control for the array of compute elements is provided on a cycle-by-cycle basis. The control can be based on one or more sets of control words. The control words can include short words, long words, and so on. The control that is provided to the array of compute elements is enabled by a stream of wide control words generated by a compiler. The compiler can include a general-purpose compiler, a specialized compiler, etc. The control words comprise bits. One or more sets of control word bits can be loaded into buffers. The control word bits comprise a control word bunch, and the sets of control word bits comprise control word bunches. The control word bunches can be loaded into buffers or "bunch buffers", where each buffer is coupled to a compute element within the array of compute elements. The control word bits provide operational control for the compute elements. In addition to providing control to the compute elements within the array, data can be transferred or "preloaded" into caches, registers, and so on prior to executing the tasks or subtasks that process the data.

The bunch buffers can be based on storage elements, registers, etc. The registers can be based on a memory element with two read ports and one write port (2R1W). The 2R1W memory element enables two read operations and one write operation to occur substantially simultaneously. A plurality of bunch buffers based on a 2R1W register is distributed throughout the array. The pluralities of sets of control word bits (bunches) can be written to bunch buffers associated with each compute element within the 2D array of compute elements. The bunches can configure the compute elements, enable the compute elements to execute operations within the array, and so on. The control word bunches can include a number of operations that can accomplish some or all of the operations associated with a task, a subtask, and so on. By providing a sufficient number of operations, autonomous operation of the compute element can be accomplished. The autonomous operation of the compute element can be based on operational looping, where the operational looping is enabled without additional control word loading into the bunch buffers. Recall that latency associated with access by a compute element to storage can be significant and can cause the compute element to stall. By performing operations without additional loading of control word bunches, load latency can be eliminated, thus expediting the execution of operations.

Tasks and subtasks that are executed by the compute elements within the array of compute elements can be associated with a wide range of applications. The applications can be based on data manipulation, such as image or audio processing applications, AI applications, business applications, data processing and analysis, and so on. The tasks that are executed can perform a variety of operations including arithmetic operations, shift operations, logical operations including Boolean operations, vector or matrix operations, tensor operations, and the like. The subtasks can be executed based on precedence, priority, coding order, amount of parallelization, data flow, data availability, compute element availability, communication channel availability, and so on.

The data manipulations are performed on a two-dimensional (2D) array of compute elements (CEs). The compute elements within the 2D array can be implemented with central processing units (CPUs), graphics processing units (GPUs), application specific integrated circuits (ASICs), field programmable gate arrays (FPGAs), processing cores, or other processing components or combinations of processing components. The compute elements can include heterogeneous processors, homogeneous processors, processor cores within an integrated circuit or chip, etc. The compute elements can be coupled to local storage, which can include local memory elements, register files, cache storage, etc. The cache, which can include a hierarchical cache such as an L1, L2, and L3 cache, can be used for storing data such as intermediate results, compressed control words, coalesced control words, decompressed control words, relevant portions of a control word, and the like. The cache can store data produced by a taken branch path, where the taken branch path is determined by a branch decision. The decompressed control word is used to control one or more compute elements within the array of compute elements. Multiple layers of the two-dimensional (2D) array of compute elements can be "stacked" to comprise a three-dimensional array of compute elements.

The tasks, subtasks, etc., that are associated with processing operations are generated by a complier. The compiler can include a general-purpose compiler, a hardware description-based compiler, a compiler written or "tuned" for the array of compute elements, a constraint-based compiler, a satisfiability-based compiler (SAT solver), and so on. Control is provided to the hardware in the form of control words, where one or more control words are generated by the compiler. The control words are provided to the array on a cycle-by-cycle basis. The control words can include wide microcode control words. The length of a microcode control word can be adjusted by compressing the control word. The compressing can be accomplished by recognizing situations where a compute element is unneeded by a task. Thus, control bits within the control word associated with the unneeded compute elements are not required for that compute element. Other compression techniques can also be applied. The control words can be used to route data, to set up operations to be performed by the compute elements, to idle individual compute elements or rows and/or columns of compute elements, etc. Noting that the compiled microcode control words that are generated by the compiler are based on bits, the control words can be compressed by selecting bits from the control words. The control word bits comprise a control word "bunch", and sets of control word bunches can be loaded into registers or "bunch buffers". The sets of control word bunches provide control to the compute elements. The control of the compute elements can be accomplished by a control unit. In embodiments, the stream of wide control words can include variable length control words generated by the compiler. The control words can be decompressed, used, etc., to configure the compute elements and other elements within the array; to enable or disable individual compute elements, rows and/or columns of compute elements; to load and store data; to route data to, from, and among compute elements; and so on. In other embodiments, the stream of wide control words generated by the compiler can provide direct, fine-grained control of the array of compute elements. The fine-grained control of the compute elements can include enabling or idling individual compute elements; enabling or idling rows or columns of compute elements; etc.

Load latency amelioration using bunch buffers enables task processing. The task processing can include data manipulation. A two-dimensional (2D) array of compute elements is accessed. The compute elements can include compute elements, processors, or cores within an integrated circuit; processors or cores within an application specific integrated circuit (ASIC); cores programmed within a programmable device such as a field programmable gate array (FPGA), and so on. The compute elements can include homogeneous or heterogeneous processors. Each compute element within the 2D array of compute elements is known to a compiler. The compiler, which can include a general-purpose compiler, a hardware-oriented compiler, or a compiler specific to the compute elements, can compile code for each of the compute elements. Each compute element is coupled to its neighboring compute elements within the array of compute elements. The coupling of the compute elements enables data communication between and among compute elements. Thus, the compiler can control data flow between and among the compute elements, and can also control data commitment to memory outside of the array. The array of compute elements is controlled on a cycle-by-cycle basis, wherein the controlling is enabled by a stream of wide control words generated by the compiler. A cycle can include a clock cycle, an architectural cycle, a system cycle, etc. The stream of wide control words generated by the compiler provides direct, fine-grained control of the 2D array of compute elements. The fine-grained control can include control of individual compute elements, memory elements, control elements, etc. A plurality of sets of control word bits is loaded into buffers. The buffers or "bunch buffers" can be used to store a number of sets of control word bunches. The buffers are each coupled to a compute element within the array of compute elements. A bunch buffer can be coupled to one or more compute elements within the array. The sets or bunches of control word bits provide operational control for the compute element. The bunches of control word bits can enable autonomous compute element operation. The autonomous operation can be based on a pointer that enables operational looping within the compute elements. The operational looping can be enabled without additional control word loading, thus ameliorating load latency.

FIG. 1 is a flow diagram for load latency amelioration using bunch buffers. Groupings of compute elements (CEs), such as CEs assembled within a 2D array of CEs, can be configured to execute a variety of operations associated with data processing. The operations can be based on tasks and on subtasks, where the subtasks are associated with the tasks. The 2D array can further interface with other elements such as controllers, storage elements, ALUs, memory management units (MMUs), GPUs, multiplier elements, and so on. The operations can accomplish a variety of processing objectives such as application processing, data manipulation, data analysis, and so on. The operations can manipulate a variety of data types including integer, real, and character data types; vectors and matrices; tensors; etc. Control is provided to the array of compute elements on a cycle-by-cycle basis, where the control is enabled by a stream of wide control words generated by the compiler. The control words, which can include microcode control words, enable or idle various compute elements; provide data; route results between or among CEs, caches, and storage; and the like. The control enables compute element operation, memory access precedence, etc. Compute element operation and memory access precedence enable the hardware to properly sequence data provision and compute element results. The control enables execution of a compiled program on the array of compute elements.

The flow 100 includes accessing a two-dimensional (2D) array 110 of compute elements, wherein each compute element within the array of compute elements is known to a compiler and is coupled to its neighboring compute elements within the array of compute elements. The compute elements can be based on a variety of types of processors. The compute elements or CEs can include central processing units (CPUs), graphics processing units (GPUs), processors or processing cores within application specific integrated circuits (ASICs), processing cores programmed within field programmable gate arrays (FPGAs), and so on. In embodiments, compute elements within the array of compute elements have identical functionality. The compute elements can include heterogeneous compute resources, where the heterogeneous compute resources may or may not be collocated within a single integrated circuit or chip. The compute elements can be configured in a topology, where the topology can be built into the array, programmed or configured within the array, etc. In embodiments, the array of compute elements is configured by a control word that can implement a topology. The topology that can be implemented can include one or more of a systolic, a vector, a cyclic, a spatial, a streaming, or a Very Long Instruction Word (VLIW) topology.

The compute elements can further include a topology suited to machine learning functionality, where the machine learning functionality is mapped by the compiler. A topology for machine learning can include supervised learning, unsupervised learning, reinforcement learning, and other machine learning topologies. The compute elements can be coupled to other elements within the array of CEs. In embodiments, the coupling of the compute elements can enable one or more further topologies. The other elements to which the CEs can be coupled can include storage elements such as one or more levels of cache storage; control units; multiplier units; address generator units for generating load (LD) and store (ST) addresses; queues; register files; and so on. The compiler to which each compute element is known can include a C, C++, or Python compiler. The compiler to which each compute element is known can include a compiler written especially for the array of compute elements. The coupling of each CE to its neighboring CEs enables clustering of compute resources; sharing of elements such as cache elements, multiplier elements, ALU elements, or control elements; communication between or among neighboring CEs; and the like.

The flow 100 includes providing control 120 to the array of compute elements on a cycle-by-cycle basis. The controlling the array can include configuration of elements such as compute elements within the array; loading and storing data; routing data to, from, and among compute elements; and so on. A cycle can include a clock cycle, an architectural cycle, a system cycle, a self-timed cycle, and the like. In the flow 100, the control is enabled 122 by a stream of wide control words. The control words can include microcode control words, compressed control words, encoded control words, and the like. The control words can be decompressed, used, etc., to configure the compute elements and other elements within the array; to enable or disable individual compute elements, rows, and/or columns of compute elements; to load and store data; to route data to, from, and among compute elements; and so on.

The one or more control words are generated 124 by the compiler. The compiler which generates the control words can include a general-purpose compiler such as a C, C++, or Python compiler; a hardware description language compiler such as a VHDL or Verilog compiler; a compiler written for the array of compute elements; and the like. In embodiments, the stream of wide control words generated by the compiler provides direct fine-grained control of the 2D array of compute elements. The compiler can be used to map functionality to the array of compute elements. In embodiments, the compiler can map machine learning functionality to the array of compute elements. The machine learning can be based on a machine learning (ML) network, a deep learning (DL) network, a support vector machine (SVM), etc. In embodiments, the machine learning functionality can include a neural network (NN) implementation. The neural network implementation can include a plurality of layers, where the layers can include one or more of input layers, hidden layers, output layers, and the like. A control word generated by the compiler can be used to configure one or more CEs, to enable data to flow to or from the CE, to configure the CE to perform an operation, and so on. Depending on the type and size of a task that is compiled to control the array of compute elements, one or more of the CEs can be controlled, while other CEs are unneeded by the particular task. A CE that is unneeded can be marked in the control word as unneeded. An unneeded CE requires no data and no control word. In embodiments, the unneeded compute element can be controlled by a single bit. In other embodiments, a single bit can control an entire row of CEs by instructing hardware to generate idle signals for each CE in the row. The single bit can be set for "unneeded", reset for "needed", or set for a similar usage of the bit to indicate when a particular CE is unneeded by a task. The control words are generated by the compiler. The control words that are generated by the compiler can include a conditionality such as a branch. The branch can include a conditional branch, an unconditional branch, etc. The control words that are compressed can be a decompressed by a decompressor logic block that decompresses words from a compressed control word cache on their way to the array. In embodiments, the provided control can include a spatial allocation of subtasks on one or more compute elements within the array of compute elements. In other embodiments, the set of provided control can enable multiple, simultaneous programming loop instances circulating within the array of compute elements. The multiple programming loop instances can include multiple instances of the same programming loop, multiple programming loops, etc.

The flow 100 includes loading a plurality of sets of control word bits into buffers 130. Recall that a control word that is generated by a compiler includes a number of bits. A set of bits can be selected from a control word, where control word bits are defined as a control word bunch. While a subtask, for example, can include a single control word, a subtask or particularly a task will more often include multiple control words, each of which consists of bits from which a set of bits can be selected. The sets of control word bits selected from the plurality of control words can be loaded into buffers called bunch buffers. The bunch buffers can include memory or storage elements such as registers. The bunch buffers can be distributed across one or more of the compute elements. In the flow 100, the buffers are each coupled to a compute element 132 within the array of compute elements. In embodiments, each of the bunch buffers includes a memory element with two read ports and one write port (2R1W). A 2R1W memory element can enable two read operations and one write operation to be executed substantially simultaneously. A 2R1W memory element can include a "standalone" element within the 2D array of elements, a compute element configured to act as a 2R1W memory element, and the like. In embodiments, a plurality of 2R1W physical register files can be distributed throughout the array of compute elements. The compute elements can be spatially separated, clustered, and the like. In embodiments, each buffer enables the storage of sixteen control word bunches. Other numbers of control word bunches can be stored, such as 2, 4, 8, 32 etc. control word bunches. The number of bunches that can be loaded into bunch buffers can be controlled by the compiler. In embodiments, the buffers can include operation buffers. Discussed previously and throughout, the operation buffers can store control word bits generated by the compiler. The control word bits configure compute elements, enable loading and storing of data, and the like.

The flow 100 further includes coupling an iteration counter 134 to each buffer. Noted above, the plurality of sets of control bits, or bunches, can be generated by the computer for a task, subtask, and so on. The task or subtask can be applied to a block of data, a dataset, multiple datasets, etc. The iteration counter can be used to indicate the number of data blocks, datasets, etc. are to be processed. In embodiments, the iteration counter can track the cycling through of the sets of control word bits in its coupled buffer. The iteration counter can indicate a number of times that the contents of bunch buffers can be accessed. Further embodiments include using a pre-stored value in an iteration counter to control operation completion. The iteration counter can be preloaded with zero (e.g., reset), a value determined by the compiler, and so on. The iteration counter can be thought to be analogous to a software "do loop". The do loop completes after a number of iterations. Embodiments can further include generating a task completion signal, based on an iteration counter value. The task completion signal can include a value, a flag, a semaphore, an interrupt, and so on.

The flow 100 further includes coupling a pointer register 136 to each buffer. A pointer register can be based on a storage element, a memory element, and so on. The pointer register can be reset to zero, loaded with a value, and so on. In embodiments, the pointer register indicates the next set of control word bits in a buffer to be executed. The next set of control word bits in a buffer to be executed can be located one step forward from the current set, one step backward from the forward set, etc. The next set of control words bits can be farther distant from the current set. The next set can be farther distant due to a conditional branch, a jump, and the like. In the flow 100, the sets of control word bits provide operational control 138 for the compute element. The operational control can include configuring a compute element, accessing data, communicating with other compute elements, and so on. The operational control can include enabling compute element operation, idling compute element operation, etc. In embodiments, the pointer enables operation looping within the compute elements. The operation looping can enable iteration as discussed previously. The operation looping can be accomplished by an overflow of the pointer register, an underflow, a comparison to a value determined by the compiler, etc. In embodiments, the operation looping can be enabled without additional control word loading. Since additional control word loading is not required, the compute element associated with the bunch buffers, interaction counter, and pointer register can continue to provide control information without pausing for a reload. A pause to reload can cause operation of the compute element to suspend while waiting for control word loading. In a worst case scenario, suspending operation of a single compute element can cause a stall of the entire 2D array.

The flow 100 further includes executing a memory operation 140 outside of the array of compute elements. Discussed above and throughout, compute elements within the 2D array of compute elements can access storage. The storage can include storage associated with a compute element such as a register file, scratchpad memory, cache, and so on. In addition, the storage can include a memory system, where the memory system can be external to the 2D array of compute elements. The memory system can include a shared memory system that is shared among 2D compute element arrays, processors, etc. The memory system can include cloud-based storage or other remote storage. In embodiments, the memory operation can be enabled by autonomous compute element operation. That is, a compute element, which is controlled by the control word bunches stored in the bunch buffers, can access storage such as memory without being supervised by a controller, a processor, and so on. In embodiments, the autonomous compute element operation can be controlled by bunches of bits. By performing a memory operation independently, the compute element can obtain data, for example, without stalling. Further, since the compute element can access memory without having to contact a controller, stalling of other compute elements can be avoided as the memory access is being controlled.

The flow 100 includes executing operations 150 within the array of compute elements, wherein the operations are based on a selected set of control word bits. A set of control bits pointed to within bunch buffers can be used to configure compute elements, to enable operations of the compute elements, to control data access and routing, and so on. Discussed above and throughout, the operations that are executed can be associated with a task, a subtask, and so on. The operations can include arithmetic, logic, array, matrix, tensor, and other operations. A number of iterations of executing operations can be accomplished based on the contents of the iteration counter. The particular operation or operations that are executed in a given cycle can be determined by the set of control word bits within the buffer pointed to by the pointer register. Recall that the control word bunch provides operational control of a particular compute element. The compute element can be enabled for operation execution, idled for a number of cycles when the compute element is not needed, etc. Recall that the operations that are executed can be repeated. In embodiments, each set of control word bits can enable operational control of a particular compute element for a discrete cycle of operations. An operation can be based on the plurality of control words within the bunch buffers. The operation that is being executed can include data dependent operations. In embodiments, the plurality of control words includes two or more data dependent branch operations. The branch operation can include two or more branches where a branch is selected based on an operation such as an arithmetic or logical operation. In a usage example, a branch operation can determine the outcome of an expression such as A>B. If A is greater than B, then one branch can be taken. If A is less than or equal to B, then another branch can be taken. In order to speed execution of a branch operation, sides of the branch can be precomputed prior to datum A and datum B being available. When the data is available, the expression can be computed, and the proper branch direction can be chosen. The untaken branch data and operations can be discarded, flushed, etc. In embodiments, the two or more data dependent branch operations can require a balanced number of execution cycles. The balanced number of execution cycles can reduce or eliminate idle cycles, stalling, and the like. In embodiments, the balanced number of execution cycles is determined by the compiler. In embodiments, the accessing, the providing, the loading, and the executing enable background memory accesses. The background memory access enables a control element to access memory independently of other compute elements, a controller, etc. In embodiments, the background memory accesses can reduce load latency. Load latency is reduced since a compute element can access memory before the compute element exhausts the data that the compute element is processing.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
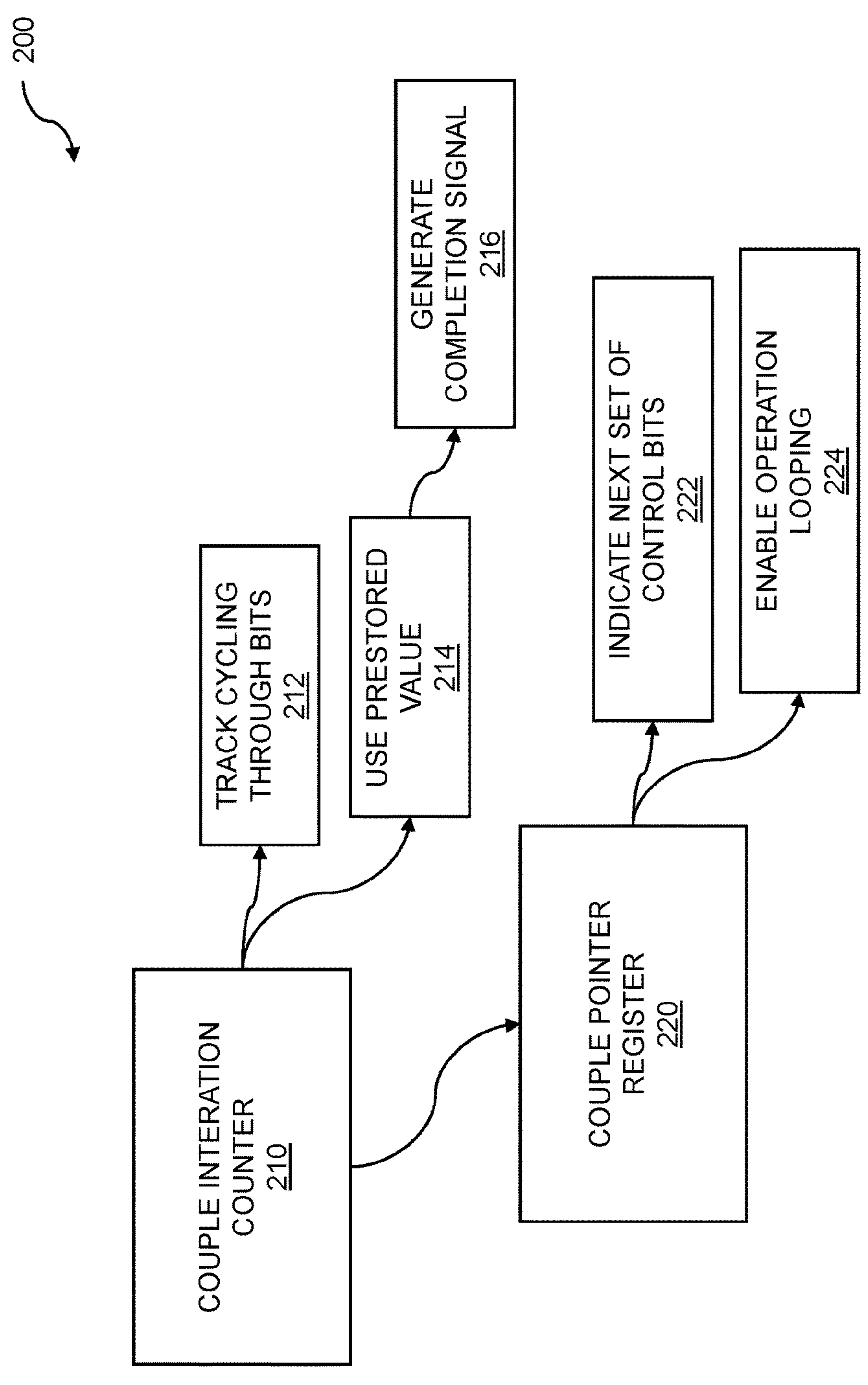
FIG. 2 is a flow diagram for buffer control.

FIG. 2 is a flow diagram for buffer control. One or more buffers can be used to control one or more elements such as compute elements within an array of elements. Collections, clusters, or groupings of compute elements (CEs), such as CEs assembled within a 2D array of CEs, can be configured to execute a variety of operations associated with programs, codes, apps, and so on. The operations can be based on tasks, and subtasks that are associated with the tasks. The 2D array can further interface with other elements such as controllers, storage elements, ALUs, MMUs, GPUs, multiplier elements, convolvers, and the like. The operations can accomplish a variety of processing objectives such as application processing, data manipulation, design and simulation, and so on. The operations can perform manipulations of a variety of data types including integer, real, floating point, and character data types; vectors and matrices; tensors; etc. Control is provided to the array of compute elements on a cycle-by-cycle basis, where the control is based on control words generated by a compiler. The control words, which can include microcode control words, enable or idle various compute elements; provide data; route results between or among CEs, caches, and storage; and the like. The control words comprise bits, where sets of control bits, referred to herein as control word bunches, can be loaded into bunch buffers. The control, which is based on the control word bunches, enables compute element operation, memory access precedence, etc. Compute element operation and memory access precedence enable the hardware to properly sequence compute element results.

Sets of control word bits or bunches can be stored in bunch buffers. By using the control word bunches, the control configures array elements such as compute elements, and enables execution of a compiled program on the array. The compute elements can access registers, scratchpads, caches, and so on, that contain control words, data, etc. The control based on control word bunches enables load latency amelioration for the 2D array of compute elements. A two-dimensional (2D) array of compute elements is accessed, wherein each compute element within the array of compute elements is known to a compiler and is coupled to its neighboring compute elements within the array of compute elements. Control for the array of compute elements is provided on a cycle-by-cycle basis, wherein the control is enabled by a stream of wide control words generated by the compiler. A plurality of sets of control word bits is loaded into buffers, wherein the buffers are each coupled to a compute element within the array of compute elements, and wherein the sets of control word bits provide operational control for the compute element. Operations are executed within the array of compute elements, wherein the operations are based on a selected set of control word bits.

The compute elements can further include one or more topologies, where a topology can be mapped by the compiler. The topology mapped by the compiler can include a graph such as a directed graph (DG) or directed acyclic graph (DAG), a Petri Net (PN), etc. In embodiments, the compiler maps machine learning functionality to the array of compute elements. The machine learning can be based on supervised, unsupervised, and semi-supervised learning; deep learning (DL); and the like. In embodiments, the machine learning functionality can include a neural network implementation. The compute elements can be coupled to other elements within the array of CEs. In embodiments, the coupling of the compute elements can enable one or more topologies. The other elements to which the CEs can be coupled can include storage elements such as one or more levels of cache storage, multiplier units, address generator units for generating load (LD) and store (ST) addresses, queues, and so on. The compiler to which each compute element is known can include a C, C++, or Python compiler.

The compiler to which each compute element is known can include a compiler written especially for the array of compute elements. The coupling of each CE to its neighboring CEs enables sharing of elements such as cache elements, multiplier elements, ALU elements, or control elements; communication between or among neighboring CEs; and the like.

The flow 200 includes coupling an iteration counter 210 to each buffer. The iteration counter can include a simple up counter, an up/down counter, an up/down counter with preset and reset, and so on. The counter can increment and decrement by a value such as zero (no count), one, two, and so on. In the flow 200, the iteration counter tracks cycling 212 through the sets of control word bits in its coupled buffer. In many processing applications, tasks and subtasks can be repeated or "cycled through". The repetition can accomplish processing of a block of data or a subset of the block of data, processing of additional blocks of data, and the like. The operations represented by the control word bunches can be executed in a forward order or a reverse order. The execution can be started at an arbitrary position within the bunch buffer, and then can proceed forward or backward from that point. The flow 200 further includes using a pre-stored value 214 in an iteration counter to control operation completion. The prestored value can include a value representing a number of iterations to be performed. The flow 200 further includes generating a task completion signal 216, based on an iteration counter value. The task completion signal can include a bit, a value, a flag, a semaphore, an interrupt, an exception, and the like.

The flow 200 further includes coupling a pointer register 220 to each buffer. The register can comprise a number of bits that can store a value. The pointer can be an object that can represent an address. The address can include a memory address, an address of a register file, a cache address, a scratchpad address, and so on. In the flow 200, the pointer register can indicate the next set of control word bits 222 in a buffer to be executed. The next set of control word bits can be adjacent to the current set of control word bits. The next set of control word bits can be further removed from the current set. In a usage example, the contents of the pointer register can proceed from one position or location within the bunch buffers to the next position forward or backward within the bunch buffers. In the event of a data-dependent branch, the contents of the pointer register can be used to transfer execution to a more remote position within the bunch buffers. In the flow 200, the pointer enables operation looping 224 within the compute elements. Iteration looping can be accomplished by overflow or underflow of the pointer register, by a preloaded value, and the like. In embodiments, the operation looping can be enabled without additional control word loading. By obviating the need to load additional control words, processing speed can be increased based on load latency amelioration. The operation looping can accomplish a variety of task and subtask execution techniques. In embodiments, the operation looping can accomplish dataflow processing within statically scheduled compute elements. The dataflow processing is based on executing a task, subtask, and so on, when needed data is available for processing, and idling when the needed data is not available. Dataflow processing is a technique that can be used to process data without the need for a control signal such as a local clock, a module clock, a system clock, etc.

Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
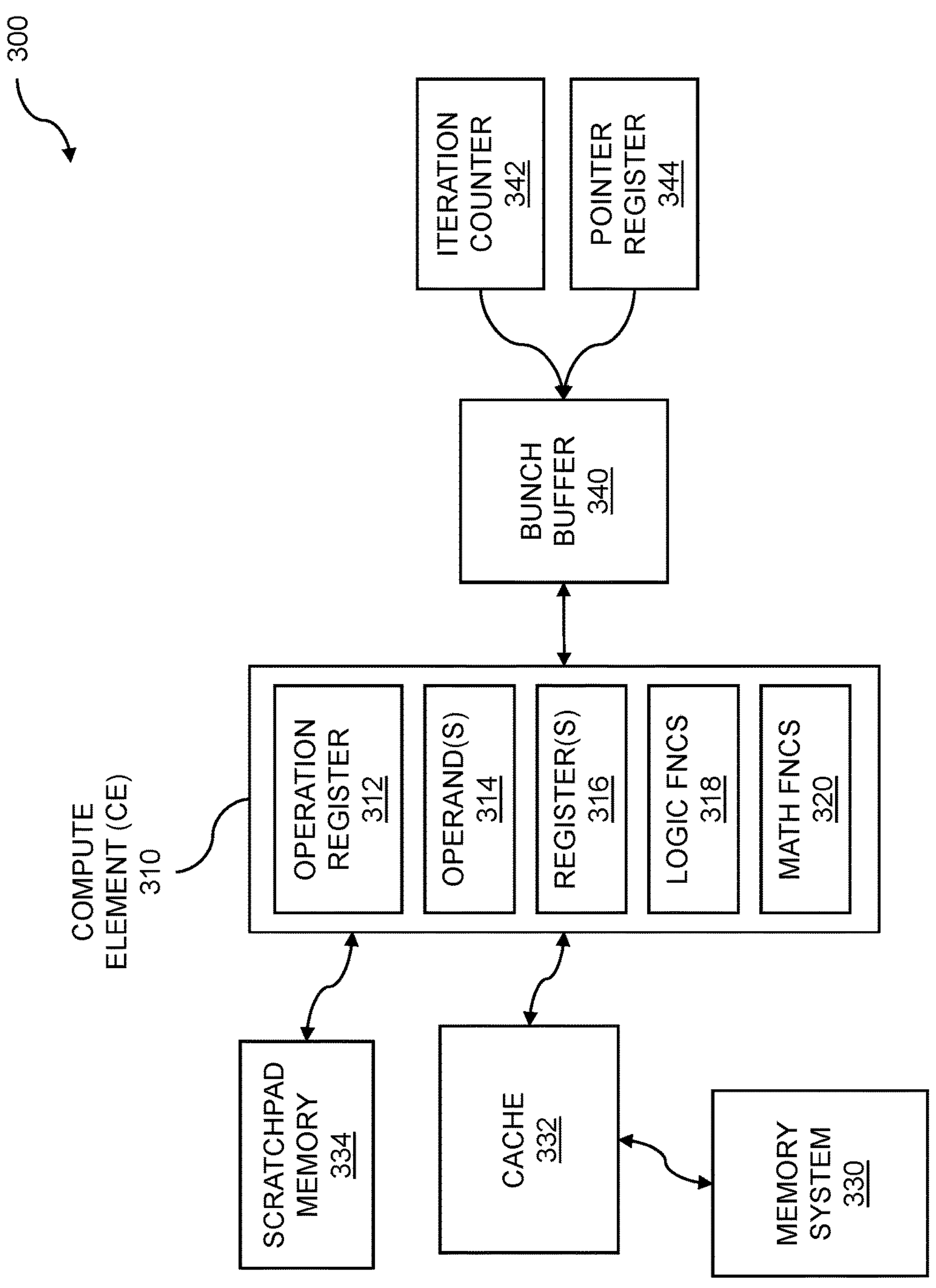
FIG. 3 is a system block diagram for a compute element.

FIG. 3 is a system block diagram for a compute element. The compute element can represent a compute element within an array of compute elements. The array of compute elements can be configured to perform a variety of operations such as arithmetic and logical operations. The array of compute elements can be configured to perform higher level processing operations such as video processing and audio processing operations. The array can be further configured for machine learning functionality, where the machine learning functionality can include a neural network implementation. One or more compute elements can be configured for load latency amelioration using bunch buffers. A two-dimensional (2D) array of compute elements is accessed, wherein each compute element within the array of compute elements is known to a compiler and is coupled to its neighboring compute elements within the array of compute elements. Control for the array of compute elements is provided on a cycle-by-cycle basis, wherein the control is enabled by a stream of wide control words generated by the compiler. A plurality of sets of control word bits is loaded into buffers, wherein the buffers are each coupled to a compute element within the array of compute elements, and wherein the sets of control word bits provide operational control for the compute element. Operations are executed within the array of compute elements, wherein the operations are based on a selected set of control word bits.

The system block diagram 300 can include a compute element (CE) 310. The compute element can be configured by providing control in the form of control words, where the control words are generated by a compiler. The compute element can include one or more components, where the components can enable or enhance operations executed by the compute element. The system block diagram 300 can include an operation register 312. The operation register can include an operation, where the operation can result from compilation of code to perform a task, a subtask, a process, and so on. The operation can be obtained from memory, loaded when the 2D array of compute elements is scheduled, and the like. The operation can include one or more fields. In embodiments, the operation can comprise one or more operands 314, one or more registers 316, and the like. The operand can include an instruction that performs various computational tasks, such as a read-modify-write operation. A read-modify-write operation can include arithmetic operations; logical operations; array, matrix, and tensor operations; and so on. The operand can be used to perform an operation on the contents of the registers. Discussed below, the contents of registers can be obtained from one or more local, scratchpad memory elements comprising register files, which can comprise one or more 2R1W register files, where the one or more 2R1W register files can be located within one compute element. The compute element can further include components for performing various functions. The block diagram 300 can include logical functions 318. The logical functions can include AND, OR, NAND, NOR, XOR, XNOR, NOT, SHIFT, and other logical functions. The block diagram 300 can further include mathematical functions 320. The mathematical functions include add, subtract, multiply, divide, maximum, minimum, average, etc. In embodiments, the logical functions and the mathematical functions can be accomplished using a component such as an arithmetic logic unit (ALU).

The contents of registers, operands, requested data, and so on, can be obtained from various types of storage. In the block diagram 300, the contents can be obtained from a memory system 330. The memory system can be included within the 2D array of compute elements, coupled to the array, located remotely from the array, etc. The memory system can include a high-speed memory system. Contents of the memory system such as requested data can be located into one or more caches 332. The one or more caches can be coupled to a compute element, a plurality of compute elements, and so on. The caches can include multilevel caches (discussed below), such as L1, L2, and L3 caches. Other memory or storage can be coupled to the compute element. The block diagram 300 can include scratchpad memory 334. A scratchpad memory can include an amount of read-write memory (e.g., RAM), registers, and so on. In embodiments, a local, scratchpad memory element comprising register files, which can comprise one or more 2R1W register files, where the one or more 2R1W register files, can be located within one compute element. The one or more 2R1W register files can include compiler assigned register files. The compiler writes the assigned register files, which comprise physical register files associated with compute elements within the 2D array of compute elements. The one or more compute elements can include compute elements within a virtual register file (discussed below). The virtual register file comprises 2R1W register files configured throughout the 2D array of compute elements.

The block diagram 300 can include a bunch buffer 340. The bunch buffer can be loaded with sets of control word bits, where the control words are generated by the compiler. Discussed above and throughout, a bunch buffer is coupled to a compute element within the 2D array of compute elements. In embodiments, the control word bits comprise a control word bunch. A control word bunch can provide control for one or more compute elements within the array of compute elements on a cycle-by-cycle basis. In embodiments, the control word bunch can provide operational control of a particular compute element. The block diagram can include an iteration counter 342. In embodiments, an iteration counter can be coupled to each buffer. Once a bunch buffer has been loaded with bunches of control word bits, the contents of the bunch buffer can be used to provide control to a compute element. The control can be applied to the compute element one or more times. In embodiments, the iteration counter tracks cycling through the sets of control word bits in its coupled buffer. The iteration counter can be loaded with a value generated by the compiler. Embodiments can include using a pre-stored value in an iteration counter to control operation completion. The pre-stored value can indicate how many "times" the control word bunches can be applied to the compute element. Embodiments can further include generating a task completion signal, based on an iteration counter value. The system block diagram 300 can further include coupling a pointer register 344 to each buffer. In embodiments, the pointer register can indicate the next set of control word bits in a buffer to be executed. The pointer register can perform a function such as a program counter, where the program counter indicates the next instruction, operation, function, etc. to be executed. In embodiments, the pointer can enable operation looping within the compute elements. In a usage example, operation looping can be used to process additional data without additional control word loading. In embodiments, the operation looping accomplishes dataflow processing within statically scheduled compute elements. The dataflow processing can be accomplished without the need for orchestration or coordinating signals such as a clock or system clock.

Figure 4:
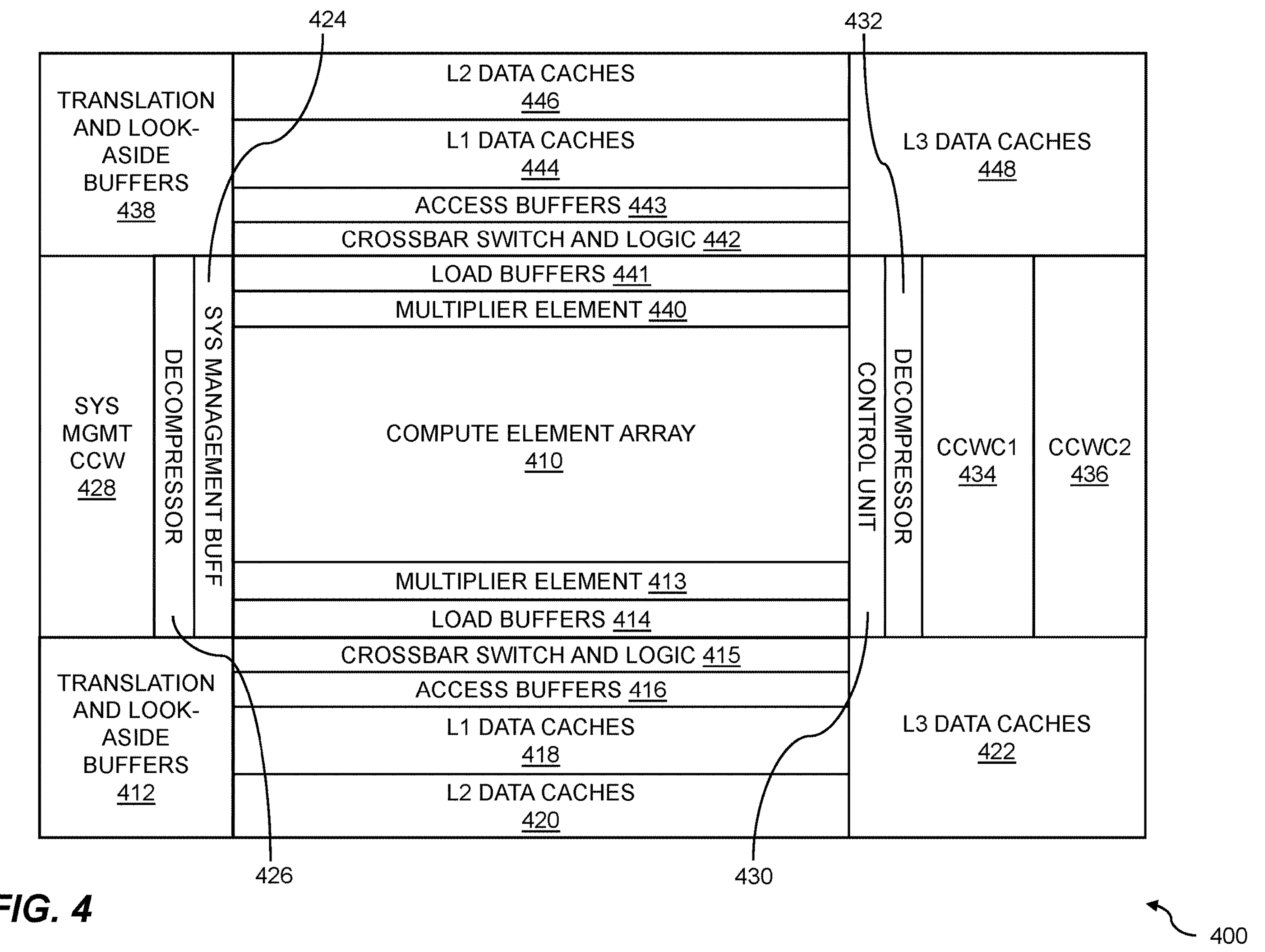
FIG. 4 illustrates a system block diagram for a highly parallel architecture with a shallow pipeline.

FIG. 4 illustrates a system block diagram for a highly parallel architecture with a shallow pipeline. The highly parallel architecture can comprise components including compute elements, processing elements, buffers, one or more levels of cache storage, system management, arithmetic logic units, multipliers, and so on. The various components can be used to accomplish task processing, where the task processing is associated with program execution, job processing, etc. The task processing is enabled based on load latency amelioration using bunch buffers. A two-dimensional (2D) array of compute elements is accessed, wherein each compute element within the array of compute elements is known to a compiler and is coupled to its neighboring compute elements within the array of compute elements. Control for the array of compute elements is provided on a cycle-by-cycle basis, wherein the control is enabled by a stream of wide control words generated by the compiler. A plurality of sets of control word bits is loaded into buffers, wherein the buffers are each coupled to a compute element within the array of compute elements, and wherein the sets of control word bits provide operational control for the compute element. Operations are executed within the array of compute elements, wherein the operations are based on a selected set of control word bits.

A system block diagram 400 for a highly parallel architecture with a shallow pipeline is shown. The system block diagram can include a compute element array 410. The compute element array 410 can be based on compute elements, where the compute elements can include processors, central processing units (CPUs), graphics processing units (GPUs), coprocessors, and so on. The compute elements can be based on processing cores configured within chips such as application specific integrated circuits (ASICs), processing cores programmed into programmable chips such as field programmable gate arrays (FPGAs), and so on. The compute elements can comprise a homogeneous array of compute elements. The system block diagram 400 can include translation and look-aside buffers such as translation and look-aside buffers 412 and 438. The translation and look-aside buffers can comprise memory caches, where the memory caches can be used to reduce storage access times.

The system block diagram 400 can include logic for load and store access order and selection. The logic for load and store access order and selection can include crossbar switch and logic 415 along with crossbar switch and logic 442. Crossbar switch and logic 415 can accomplish load and store access order and selection for the lower data cache blocks (418 and 420), and crossbar switch and logic 442 can accomplish load and store access order and selection for the upper data cache blocks (444 and 446). Crossbar switch and logic 415 enables high-speed data communication between the lower-half compute elements of compute element array 410 and data caches 418 and 420 using access buffers 416. Crossbar switch and logic 442 enables high-speed data communication between the upper-half compute elements of compute element array 410 and data caches 444 and 446 using access buffers 443. The access buffers 416 and 443 allow logic 415 and logic 442, respectively, to hold load or store data until any memory hazards are resolved. In addition, splitting the data cache between physically adjacent regions of the compute element array can enable the doubling of load access bandwidth, the reducing of interconnect complexity, and so on. While loads can be split, stores can be driven to both lower data caches 418 and 420 and upper data caches 444 and 446.

The system block diagram 400 can include lower load buffers 414 and upper load buffers 441. The load buffers can provide temporary storage for memory load data so that it is ready for low latency access by the compute element array 410. The system block diagram can include dual level 1 (L1) data caches, such as L1 data caches 418 and 444. The L1 data caches can be used to hold blocks of load and/or store data, such as data to be processed together, data to be processed sequentially, and so on. The L1 cache can include a small, fast memory that is quickly accessible by the compute elements and other components. The system block diagram can include level 2 (L2) data caches. The L2 caches can include L2 caches 420 and 446. The L2 caches can include larger, slower storage in comparison to the L1 caches. The L2 caches can store "next up" data, results such as intermediate results, and so on. The L1 and L2 caches can further be coupled to level 3 (L3) caches. The L3 caches can include L3 caches 422 and 448. The L3 caches can be larger than the L2 and L1 caches and can include slower storage. Accessing data from L3 caches is still faster than accessing main storage. In embodiments, the L1, L2, and L3 caches can include 4-way set associative caches.

The system block diagram 400 can include lower multiplier element 413 and upper multiplier element 440. The multiplier elements can provide an efficient multiplication function of data coming out of the compute element array and/or data moving into the compute element array. Multiplier element 413 can be coupled to the compute element array 410 and load buffers 414, and multiplier element 440 can be coupled to compute element array 410 and load buffers 441.

The system block diagram 400 can include a system management buffer 424. The system management buffer can be used to store system management codes or control words that can be used to control the array 410 of compute elements. The system management buffer can be employed for holding opcodes, codes, routines, functions, etc. which can be used for exception or error handling, management of the parallel architecture for processing tasks, and so on. The system management buffer can be coupled to a decompressor 426. The decompressor can be used to decompress system management compressed control words (CCWs) from system management compressed control word buffer 428 and can store the decompressed system management control words in the system management buffer 424. The compressed system management control words can require less storage than the uncompressed control words. The system management CCW component 428 can also include a spill buffer. The spill buffer can comprise a large static random-access memory (SRAM) which can be used to support multiple nested levels of exceptions.

The compute elements within the array of compute elements can be controlled by a control unit such as control unit 430. While the compiler, through the control word, controls the individual elements, the control unit can pause the array to ensure that new control words are not driven into the array. The control unit can receive a decompressed control word from a decompressor 432 and can drive out the decompressed control word into the appropriate compute elements of compute element array 410. The decompressor can decompress a control word (discussed below) to enable or idle rows or columns of compute elements, to enable or idle individual compute elements, to transmit control words to individual compute elements, etc. The decompressor can be coupled to a compressed control word store such as compressed control word cache 1 (CCWC1) 434. CCWC1 can include a cache such as an L1 cache that includes one or more compressed control words. CCWC1 can be coupled to a further compressed control word store such as compressed control word cache 2 (CCWC2) 436. CCWC2 can be used as an L2 cache for compressed control words. CCWC2 can be larger and slower than CCWC1. In embodiments, CCWC1 and CCWC2 can include 4-way set associativity. In embodiments, the CCWC1 cache can contain decompressed control words, in which case it could be designated as DCWC1. In that case, decompressor 432 can be coupled between CCWC1 434 (now DCWC1) and CCWC2 436.

Figure 5:
FIG. 5 shows compute element array detail.

FIG. 5 shows compute element array detail 500. A compute element array can be coupled to components which enable the compute elements within the array of compute elements to process one or more tasks, subtasks, and so on. The components can access and provide data, perform specific high-speed operations, and the like. The components can be configured into a variety of computational topologies. The compute element array and its associated components enable load latency amelioration using bunch buffers. The compute element array 510 can perform a variety of processing tasks, where the processing tasks can include operations such as arithmetic, vector, matrix, or tensor operations; audio and video processing operations; neural network operations; etc. The compute elements can be coupled to multiplier units such as lower multiplier units 512 and upper multiplier units 514. The multiplier units can be used to perform high-speed multiplications associated with general processing tasks, multiplications associated with neural networks such as deep learning networks, multiplications associated with vector operations, and the like. The compute elements can be coupled to load buffers such as load buffers 516 and load buffers 518. The load buffers can be coupled to the L1 data caches as discussed previously. In embodiments, a crossbar switch (not shown) can be coupled between the load buffers and the data caches. The load buffers can be used to load storage access requests from the compute elements. The load buffers can track expected load latencies and can notify a control unit if a load latency exceeds a threshold. Notification of the control unit can be used to signal that a load may not arrive within an expected timeframe. The load buffers can further be used to pause the array of compute elements. The load buffers can send a pause request to the control unit that will pause the entire array, while individual elements can be idled under control of the control word. When an element is not explicitly controlled, it can be placed in the idle (or low power) state. No operation is performed, but ring buses can continue to operate in a "pass thru" mode to allow the rest of the array to operate properly. When a compute element is used just to route data unchanged through its ALU, it is still considered active.

While the array of compute elements is paused, background loading of the array from the memories (data memory and control word memory) can be performed. The memory systems can be free running and can continue to operate while the array is paused. Because multi-cycle latency can occur due to control signal transport that results in additional "dead time", allowing the memory system to "reach into" the array and to deliver load data to appropriate scratchpad memories can be beneficial while the array is paused. This mechanism can operate such that the array state is known, as far as the compiler is concerned. When array operation resumes after a pause, new load data will have arrived at a scratchpad, as required for the compiler to maintain the statically scheduled model.

Figure 6:
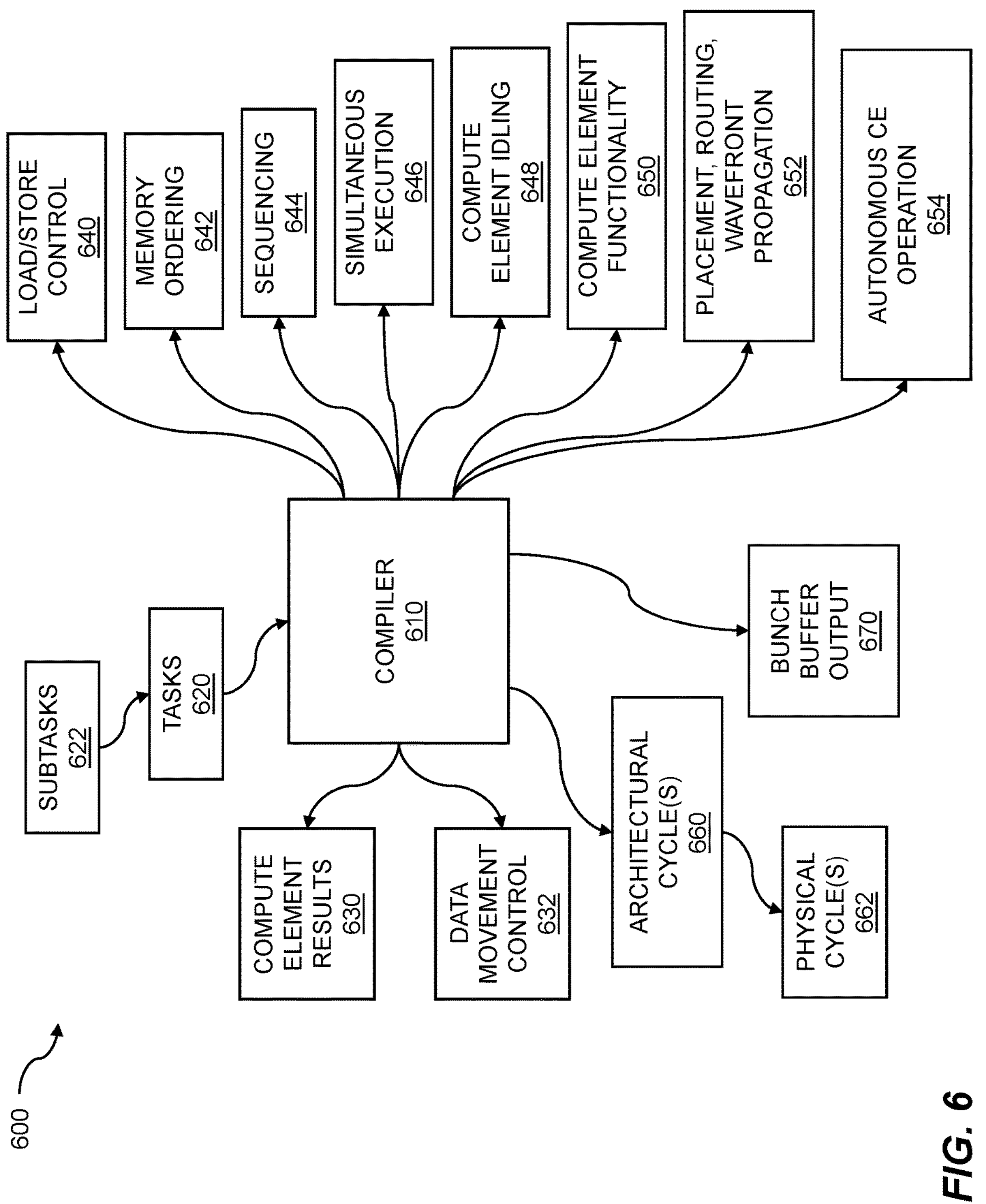
FIG. 6 illustrates a system block diagram for compiler interactions.

FIG. 6 illustrates a system block diagram for compiler interactions. Discussed throughout, compute elements within a 2D array are known to a compiler which can compile tasks and subtasks for execution on the array. The compiled tasks and subtasks are executed to accomplish task processing. A variety of interactions, such as configuration of compute elements, placement of tasks, routing of data, and so on, can be associated with the compiler. The compiler interactions enable load latency amelioration using bunch buffers. A two-dimensional (2D) array of compute elements is accessed, wherein each compute element within the array of compute elements is known to a compiler and is coupled to its neighboring compute elements within the array of compute elements. Control for the array of compute elements is provided on a cycle-by-cycle basis, wherein the control is enabled by a stream of wide control words generated by the compiler. A plurality of sets of control word bits is loaded into buffers, wherein the buffers are each coupled to a compute element within the array of compute elements, and wherein the sets of control word bits provide operational control for the compute element. Operations are executed within the array of compute elements, wherein the operations are based on a selected set of control word bits.

The system block diagram 600 includes a compiler 610. The compiler can include a high-level compiler such as a C, C++, Python, or similar compiler. The compiler can include a compiler implemented for a hardware description language such as a VHDL™ or Verilog™ compiler. The compiler can include a compiler for a portable, language-independent, intermediate representation such as low-level virtual machine (LLVM) intermediate representation (IR). The compiler can generate a set of directions that can be provided to the computer elements and other elements within the array. The compiler can be used to compile tasks 620. The tasks can include a plurality of tasks associated with a processing task. The tasks can further include a plurality of subtasks 622. The tasks can be based on an application such as a video processing or audio processing application. In embodiments, the tasks can be associated with machine learning functionality. The compiler can generate directions for handling compute element results 630. The compute element results can include results derived from arithmetic, vector, array, and matrix operations; Boolean operations; and so on. In embodiments, the compute element results are generated in parallel in the array of compute elements. Parallel results can be generated by compute elements, where the compute elements can share input data, use independent data, and the like. The compiler can generate a set of directions that controls data movement 632 for the array of compute elements. The control of data movement can include movement of data to, from, and among compute elements within the array of compute elements. The control of data movement can include loading and storing data, such as temporary data storage, during data movement. In other embodiments, the data movement can include intra-array data movement.

As with a general-purpose compiler used for generating tasks and subtasks for execution on one or more processors, the compiler 610 can provide directions for task and subtasks handling, input data handling, intermediate and result data handling, and so on. The directions can include one or more operations, where the one or more operations can be executed by one or more compute elements within the array of compute elements. The compiler can further generate directions for configuring the compute elements, storage elements, control units, ALUs, and so on, associated with the array. As previously discussed, the compiler generates directions for data handling to support the task handling. In the system block diagram, the data movement can include loads and stores 640 with a memory array. The loads and stores can include handling various data types such as integer, real or float, double-precision, character, and other data types. The loads and stores can load and store data into local storage such as registers, register files, caches, and the like. The caches can include one or more levels of cache such as a level 1 (L1) cache, a level 2 (L2) cache, a level 3 (L3) cache, and so on. The loads and stores can also be associated with storage such as shared memory, distributed memory, etc. In addition to the loads and stores, the compiler can handle other memory and storage management operations including memory precedence. In the system block diagram, the memory access precedence can enable ordering of memory data 642. Memory data can be ordered based on task data requirements, subtask data requirements, and so on. The memory data ordering can enable parallel execution of tasks and subtasks.

In the system block diagram 600, the ordering of memory data can enable compute element result sequencing 644. In order for task processing to be accomplished successfully, tasks and subtasks must be executed in an order that can accommodate task priority, task precedence, a schedule of operations, and so on. The memory data can be ordered such that the data required by the tasks and subtasks can be available for processing when the tasks and subtasks are scheduled to be executed. The results of the processing of the data by the tasks and subtasks can therefore be ordered to optimize task execution, to reduce or eliminate memory contention conflicts, etc. The system block diagram includes enabling simultaneous execution 646 of two or more potential compiled task outcomes based on the set of directions. The code that is compiled by the compiler can include branch points, where the branch points can include computations or flow control. Flow control transfers program execution to a different sequence of control words. Since the result of a branch decision, for example, is not known a priori, the initial operations associated with both paths are encoded in the currently executing control word stream. When the correct result of the branch is determined, then the sequence of control words associated with the correct branch result continues execution, while the operations for the branch path not taken are halted and side effects may be flushed. In embodiments, the two or more potential branch paths can be executed on spatially separate compute elements within the array of compute elements.

The system block diagram includes compute element idling 648. In embodiments, the set of directions from the compiler can idle an unneeded compute element within a row of compute elements located in the array of compute elements. Not all of the compute elements may be needed for processing, depending on the tasks, subtasks, and so on that are being processed. The compute elements may not be needed simply because there are fewer tasks to execute than there are compute elements available within the array. In embodiments, the idling can be controlled by a single bit in the control word generated by the compiler. In the system block diagram, compute elements within the array can be configured for various compute element functionalities 650. The compute element functionality can enable various types of compute architectures, processing configurations, and the like. In embodiments, the set of directions can enable machine learning functionality. The machine learning functionality can be trained to process various types of data such as image data, audio data, medical data, etc. In embodiments, the machine learning functionality can include neural network implementation. The neural network can include a convolutional neural network, a recurrent neural network, a deep learning network, and the like. The system block diagram can include compute element placement, results routing, and computation wave-front propagation 652 within the array of compute elements. The compiler can generate directions that can place tasks and subtasks on compute elements within the array. The placement can include placing tasks and subtasks based on data dependencies between or among the tasks or subtasks, placing tasks that avoid memory conflicts or communications conflicts, etc. The directions can also enable computation wave-front propagation. Computation wave-front propagation can implement and control how execution of tasks and subtasks proceeds through the array of compute elements. The system block diagram 600 can include autonomous compute element (CE) operation 654. Autonomous CE operation enables one or more operations to occur outside of direct control word management.

In the system block diagram, the compiler can control architectural cycles 660. An architectural cycle can include an abstract cycle that is associated with the elements within the array of elements. The elements of the array can include compute elements, storage elements, control elements, ALUs, and so on. An architectural cycle can include an "abstract" cycle, where an abstract cycle can refer to a variety of architecture level operations such as a load cycle, an execute cycle, a write cycle, and so on. The architectural cycles can refer to macro-operations of the architecture rather than to low level operations. One or more architectural cycles are controlled by the compiler. Execution of an architectural cycle can be dependent on two or more conditions. In embodiments, an architectural cycle can occur when a control word is available to be pipelined into the array of compute elements and when all data dependencies are met. That is, the array of compute elements does not have to wait for either dependent data to load or for a full memory buffer to clear. In the system block diagram, the architectural cycle can include one or more physical cycles 662. A physical cycle can refer to one or more cycles at the element level required to implement a load, an execute, a write, and so on. In embodiments, the set of directions can control the array of compute elements on a physical cycle-by-cycle basis. The physical cycles can be based on a clock such as a local, module, or system clock, or some other timing or synchronizing technique. In embodiments, the physical cycle-by-cycle basis can include an architectural cycle. The physical cycles can be based on an enable signal for each element of the array of elements, while the architectural cycle can be based on a global, architectural signal. In embodiments, the compiler can provide, via the control word, valid bits for each column of the array of compute elements, on the cycle-by-cycle basis. A valid bit can indicate that data is valid and ready for processing, that an address such as a jump address is valid, and the like. In embodiments, the valid bits can indicate that a valid memory load access is emerging from the array. The valid memory load access from the array can be used to access data within a memory or storage element. In other embodiments, the compiler can provide, via the control word, operand size information for each column of the array of compute elements. Various operand sizes can be used. In embodiments, the operand size can include bytes, half-words, words, and doublewords.

Discussed above and throughout, the control word bits comprise a control word bunch. A control word bunch can include a subset of bits in a control word. In embodiments, the control word bunch can provide operational control of a particular compute element, a multiplier unit, and so on. Buffers, or "bunch buffers" can be placed at each control element. In embodiments, the bunch buffers can hold a number of bunches such as 16 bunches. Other numbers of bunches such as 8, 32, 64 bunches, and so on, can also be used. In the system block diagram 600, the compiler can control bunch buffer output 670. The output of a bunch buffer associated with a compute element, multiplier element, etc., can control the associated compute element or multiplier element. In embodiments, an iteration counter can be associated with each bunch buffer. The interaction counter can be used to control a number of times that the bits within the bunch buffer are cycled through. In further embodiments, a bunch buffer pointer can be associated with each bunch buffer. The bunch buffer counter can be used to indicate or "point to" the next bunch of control word bits to apply to the compute element or multiplier element. In embodiments, data paths associated with the bunch buffers can be balanced during a compile time associated with processing tasks, subtasks, and so on. The balancing the data paths can enable compute elements to operate without the risk of a single compute element being starved for data, which could result in stalling the two-dimensional array of compute elements as data is obtained for the compute element. Further, the balancing the data paths can enable an autonomous operation technique. In embodiments, the autonomous operation technique can include a dataflow technique.

Figure 7:
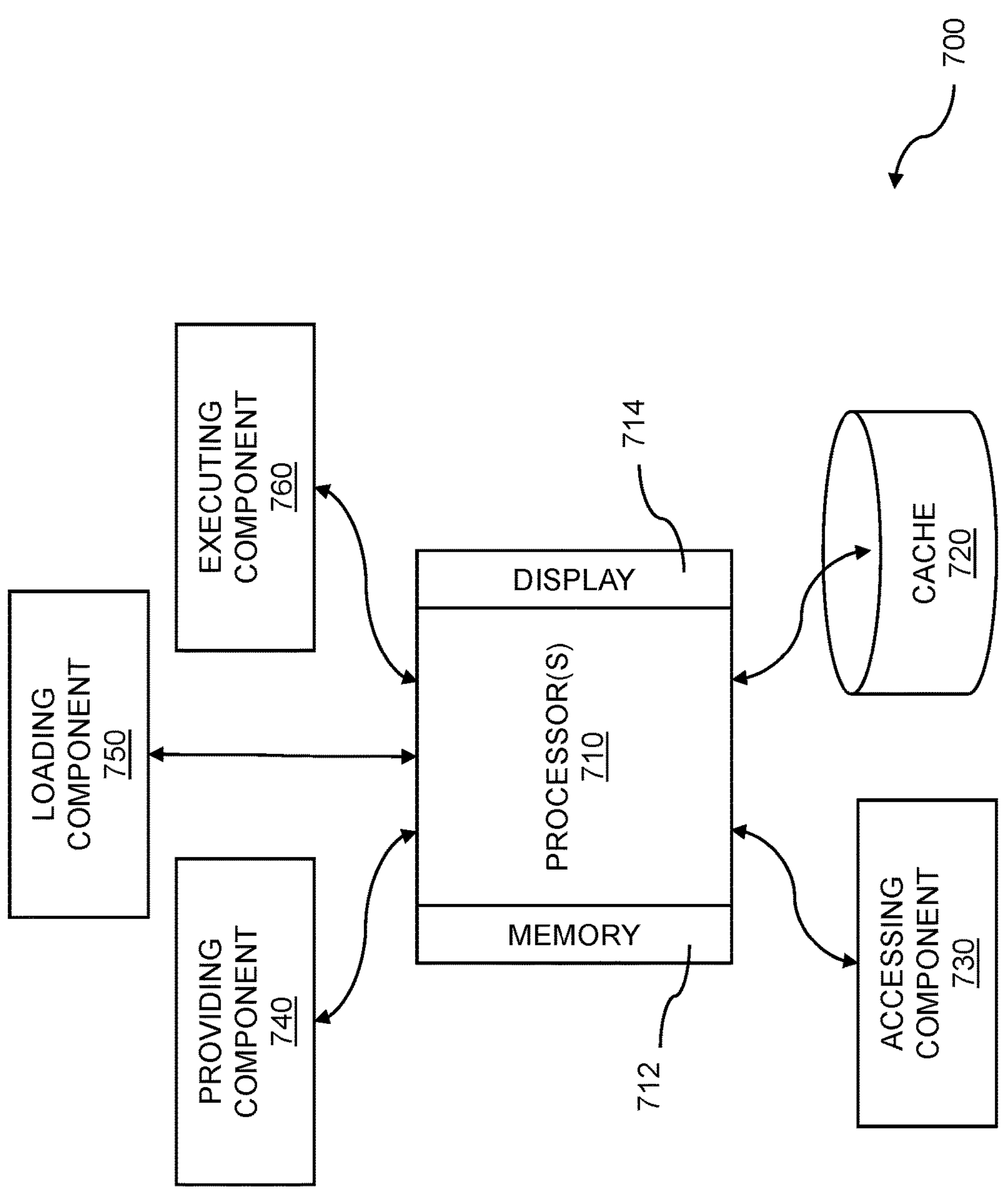
FIG. 7 is a system diagram for load latency amelioration using bunch buffers.

FIG. 7 is a system diagram for task processing. The task processing is enabled by load latency amelioration using bunch buffers. The system 700 can include one or more processors 710, which are attached to a memory 712 which stores instructions. The system 700 can further include a display 714 coupled to the one or more processors 710 for displaying data; intermediate steps; directions; control words; control word bunches; compressed control words; control words implementing Very Long Instruction Word (VLIW) functionality; topologies including systolic, vector, cyclic, spatial, streaming, or VLIW topologies; and so on. In embodiments, one or more processors 710 are coupled to the memory 712, wherein the one or more processors, when executing the instructions which are stored, are configured to: access a two-dimensional (2D) array of compute elements, wherein each compute element within the array of compute elements is known to a compiler and is coupled to its neighboring compute elements within the array of compute elements; provide control for the array of compute elements on a cycle-by-cycle basis, wherein the control is enabled by a stream of wide control words generated by the compiler; load a plurality of sets of control word bits into buffers, wherein the buffers are each coupled to a compute element within the array of compute elements, and wherein the sets of control word bits provide operational control for the compute element; and execute operations within the array of compute elements, wherein the operations are based on a selected set of control word bits. The compute elements can include compute elements within one or more integrated circuits or chips; compute elements or cores configured within one or more programmable chips such as application specific integrated circuits (ASICs); field programmable gate arrays (FPGAs); heterogeneous processors configured as a mesh; standalone processors; etc.

The system 700 can include a cache 720. The cache 720 can be used to store data such as scratchpad data, operations that support a balanced number of execution cycles for a data-dependent branch, directions to compute elements, control words, control word bunches comprising control word bits, intermediate results, microcode, branch decisions, and so on. The cache can comprise a small, local, easily accessible memory available to one or more compute elements. In embodiments, the data that is stored can include preloaded data that can enable load latency amelioration. The data within the cache can include data required to support dataflow processing by statically scheduled compute elements within the 2D array of compute elements. The cache can be accessed by one or more compute elements. The cache, if present, can include a dual read, single write (2R1W) cache. That is, the 2R1W cache can enable two read operations and one write operation contemporaneously without the read and write operations interfering with one another.

The system 700 can include an accessing component 730. The accessing component 730 can include control logic and functions for accessing a two-dimensional (2D) array of compute elements. Each compute element within the array of compute elements is known to a compiler and is coupled to its neighboring compute elements within the array of compute elements. A compute element can include one or more processors, processor cores, processor macros, processor cells, and so on. Each compute element can include an amount of local storage. The local storage may be accessible by one or more compute elements. Each compute element can communicate with neighbors, where the neighbors can include nearest neighbors or more remote "neighbors". Communication between and among compute elements can be accomplished using a bus such as an industry standard bus, a ring bus, a network such as a wired or wireless computer network, etc. In embodiments, the ring bus is implemented as a distributed multiplexor (MUX).

The system 700 can include a providing component 740. The providing component 740 can include control and functions for providing control for the array of compute elements on a cycle-by-cycle basis, wherein the control is enabled by a stream of wide control words generated by the compiler. The control words can be based on low-level control words such as assembly language words, microcode words, and so on. The control can be based on bits, where control word bits comprise a control word bunch (described shortly below). The control of the array of compute elements on a cycle-by-cycle basis can include configuring the array to perform various compute operations. In embodiments, the stream of wide control words generated by the compiler provides direct, fine-grained control of the 2D array of compute elements. The wide control words can comprise variable length control words. The compute operations can enable audio or video processing, artificial intelligence processing, machine learning, deep learning, and the like. The providing control can be based on microcode control words, where the microcode control words can include opcode fields, data fields, compute array configuration fields, etc. The compiler that generates the control can include a general-purpose compiler, a parallelizing compiler, a compiler optimized for the array of compute elements, a compiler specialized to perform one or more processing tasks, and so on. The providing control can implement one or more topologies such as processing topologies within the array of compute elements. In embodiments, the topologies implemented within the array of compute elements can include a systolic, a vector, a cyclic, a spatial, a streaming, or a Very Long Instruction Word (VLIW) topology. Other topologies can include a neural network topology. A control can enable machine learning functionality for the neural network topology.

The system block diagram 700 can include a loading component 750. The loading component 750 can include control and functions for loading a plurality of sets of control word bits into buffers. Control word bits can include one or more bits associated with a control word, and a set of control word bits can include the control word bits associated with two or more control words. In embodiments, the control word bits comprise a control word bunch. A control word bunch can include a fixed-size bunch, a variable-size bunch, etc. The buffers into which the sets of control word bits are loaded are each coupled to a compute element within the array of compute elements. A buffer can be coupled to more than one compute element. The sets of control word bits provide operational control for the compute element. The operational control for the compute element can be based on a number of cycles, an amount of time, and so on. In embodiments, each set of control word bits can enable operational control of a particular compute element for a discrete cycle of operations. The number of operations can include more than one operation. In embodiments, the plurality of control words can include two or more data dependent branch operations. The data dependent branch operations can include arithmetic operations, logical operations, and so on. In embodiments, the two or more data dependent branch operations can require a balanced number of execution cycles. The balanced number of execution cycles can be used to ameliorate load balancing by reducing a number of memory accesses triggered by a data dependent branch. In embodiments, the balanced number of execution cycles can be determined by the compiler.

The system 700 can include an executing component 760. The executing component 760 can include control and functions for executing operations within the array of compute elements, wherein the operations are based on a selected set of control word bits. The operations that can be performed can include arithmetic operations, Boolean operations, matrix operations, neural network operations, and the like. The operations can be executed based on the control words generated by the compiler. The control words can be provided to a control unit where the control unit can control the operations of the compute elements within the array of compute elements. Operation of the compute elements can include configuring the compute elements, providing data to the compute elements, routing and ordering results from the compute elements, and so on. In embodiments, the same control word bunches associated with control words can be executed on a given cycle across the array of compute elements. The control word bunches can provide control on a per compute element basis, where each control word can be comprised of a plurality of compute element control groups, clusters, and so on. In embodiments, a control unit can operate on control word bunches. The executing operations contained in the control word bunches can include distributed execution of operations. In embodiments, the distributed execution of operations can occur in two or more compute elements within the array of compute elements. The executing operations can include storage access, where the storage can include a scratchpad memory, one or more caches, register files, etc., within the 2D array of compute elements. Further embodiments include a memory operation outside of the array of compute elements. The "outside" memory operation can include access to a memory such as a high-speed memory, a shared memory, remote memory, etc. In embodiments, the memory operation can be enabled by autonomous compute element operation. As for other control associated with the array of compute elements, the autonomous compute element operation is controlled by bunches of bits. In a usage example, control word bunches can be loaded into buffers to control operation of one or more compute elements. Data to be operated on by the control word bunches can be loaded. Data operations can be performed by the compute elements without loading further control word bunches for a number of cycles. The autonomous compute element operation can be based on operation looping. In embodiments, the operation looping can accomplish dataflow processing within statically scheduled compute elements. Dataflow processing can include processing based on the presence or absence of data. The dataflow processing can be performed without requiring access to external storage.

The system 700 can include a computer program product embodied in a non-transitory computer readable medium for task processing, the computer program product comprising code which causes one or more processors to perform operations of: accessing a two-dimensional (2D) array of compute elements, wherein each compute element within the array of compute elements is known to a compiler and is coupled to its neighboring compute elements within the array of compute elements; providing control for the array of compute elements on a cycle-by-cycle basis, wherein the control is enabled by a stream of wide control words generated by the compiler; loading a plurality of sets of control word bits into buffers, wherein the buffers are each coupled to a compute element within the array of compute elements, and wherein the sets of control word bits provide operational control for the compute element; and executing operations within the array of compute elements, wherein the operations are based on a selected set of control word bits.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for task processing comprising:

accessing a two-dimensional array of compute elements, wherein each compute element within the array of compute elements is known to a compiler and is coupled to its neighboring compute elements within the array of compute elements;

providing control for the array of compute elements on a cycle-by-cycle basis, wherein the control is enabled by a stream of wide control words generated by the compiler, wherein the control words that are provided enable parallel execution of tasks, wherein the tasks include two or more tasks that are independent of one another;

loading sets of control word bits into buffers, wherein each buffer is associated with and coupled to a unique compute element within the array of compute elements, and wherein the sets of control word bits provide operational control for the compute element with which it is associated; and executing operations within the array of compute elements, wherein the operations are based on a selected set of control word bits, wherein the selected set of control word bits comprise a control word bunch.

2. The method of claim 1 wherein control word bunch enables operational control of a particular compute element for a plurality of cycles.

3. The method of claim 1 further comprising coupling an iteration counter to each buffer.

4. The method of claim 3 wherein the iteration counter tracks cycling through the sets of control word bits in the buffer coupled to the iteration counter.

5. The method of claim 3 further comprising using a pre-stored value in an iteration counter to control operation completion.

6. The method of claim 3 further comprising generating a task completion signal, based on an iteration counter value.

7. The method of claim 1 further comprising coupling a pointer register to each buffer.

8. The method of claim 7 wherein the pointer register indicates a next set of control word bits in a buffer to be executed.

9. The method of claim 7 wherein the pointer enables operation looping within the compute elements.

10. The method of claim 9 wherein the operation looping is enabled without additional control word loading.

11. The method of claim 9 wherein the operation looping accomplishes dataflow processing within statically scheduled compute elements.

12. The method of claim 1 wherein the stream of wide control words includes two or more data dependent branch operations.

13. The method of claim 12 wherein the two or more data dependent branch operations require a balanced number of execution cycles.

14. The method of claim 13 wherein the balanced number of execution cycles is determined by the compiler.

15. The method of claim 1 further comprising executing a memory operation outside of the array of compute elements.

16. The method of claim 15 wherein the memory operation is enabled by autonomous compute element operation.

17. The method of claim 16 wherein the autonomous compute element operation is controlled by one or more sets of control word bits.

18. The method of claim 1 wherein each buffer enables storing sixteen control word bunches.

19. The method of claim 1 wherein the buffers comprise operation buffers.

20. The method of claim 1 wherein the accessing, the providing, the loading, and the executing enable background memory accesses.

21. The method of claim 20 wherein the background memory accesses reduce load latency.

22. The method of claim 1 wherein the selected set of control word bits is selected from the stream of control words.

23. The method of claim 1 wherein the selected set of control word bits is loaded into a bunch buffer.

24. A computer program product embodied in a non-transitory computer readable medium for task processing, the computer program product comprising code which causes one or more processors to perform operations of:

accessing a two-dimensional array of compute elements, wherein each compute element within the array of compute elements is known to a compiler and is coupled to its neighboring compute elements within the array of compute elements;

providing control for the array of compute elements on a cycle-by-cycle basis, wherein the control is enabled by a stream of wide control words generated by the compiler, wherein the control words that are provided enable parallel execution of tasks, wherein the tasks include two or more tasks that are independent of one another;

loading sets of control word bits into buffers, wherein each buffer is associated with and coupled to a unique compute element within the array of compute elements, and wherein the sets of control word bits provide operational control for the compute element with which it is associated; and executing operations within the array of compute elements, wherein the operations are based on a selected set of control word bits, wherein the selected set of control word bits comprise a control word bunch.

25. A computer system for task processing comprising:

a memory which stores instructions;

one or more processors coupled to the memory, wherein the one or more processors, when executing the instructions which are stored, are configured to:

access a two-dimensional array of compute elements, wherein each compute element within the array of compute elements is known to a compiler and is coupled to its neighboring compute elements within the array of compute elements;

provide control for the array of compute elements on a cycle-by-cycle basis, wherein the control is enabled by a stream of wide control words generated by the compiler, wherein the control words that are provided enable parallel execution of tasks, wherein the tasks include two or more tasks that are independent of one another;

load sets of control word bits into buffers, wherein each buffer is associated with and coupled to a unique compute element within the array of compute elements, and wherein the sets of control word bits provide operational control for the compute element with which it is associated; and execute operations within the array of compute elements, wherein the operations are based on a selected set of control word bits, wherein the selected set of control word bits comprise a control word bunch.

* * * * *